S. M. DOOLITTLE.
METHOD OF MAKING FERTILIZER.
APPLICATION FILED JUNE 5, 1912.
1,045,130.
Patented Nov. 26, 1912.
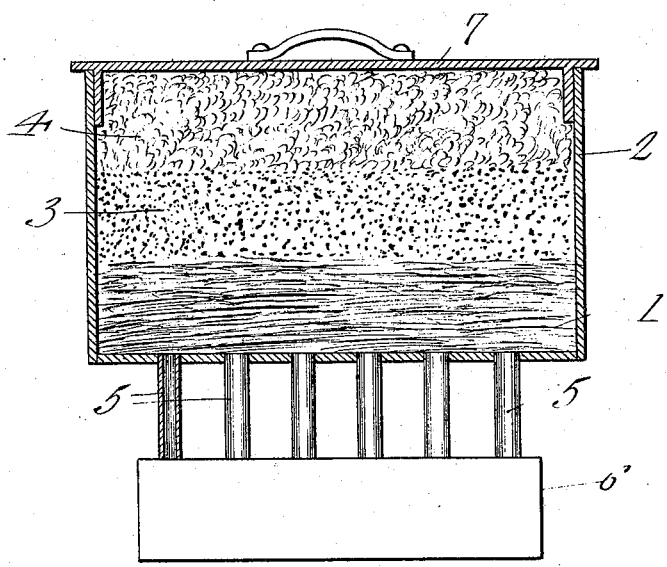
Witnesses
Samuel M. Doolittle
Inventor
by C. A. Snow & Co.
Attorneys

UNITED STATES PATENT OFFICE.

SAMUEL M. DOOLITTLE, OF DECKER, INDIANA.

METHOD OF MAKING FERTILIZER.

1,045,130.  Specification of Letters Patent.  Patented Nov. 26, 1912.

Application filed June 5, 1912. Serial No. 701,923.

*To all whom it may concern:*

Be it known that I, SAMUEL M. DOOLITTLE, a citizen of the United States, residing at Decker, in the county of Knox and State of Indiana, have invented a new and useful Method of Making Fertilizer, of which the following is a specification.

This invention relates to a method of making fertilizers, one of its objects being to convert straw and other waste vegetation into an efficient fertilizer having all of the properties of ordinary farm manure.

Another object is to conserve the water used as an agent to promote decomposition, as a liquid fertilizer for the treatment of growing plants.

With the foregoing and other objects in view the invention consists in the certain steps of the method and in the combination of ingredients hereinafter more fully described and pointed out in the claims.

In the accompanying drawing, which is a view partly in section, and partly in elevation, one form of apparatus employed in producing the fertilizer, has been shown.

In carrying out the invention straw, weeds, clover chaff, or any other waste vegetation, such as shown generally at 1, is packed within the lower portion of a vat 2. This vegetation is then covered with a layer or bed of lime, indicated at 3 and which, is turn, is covered with manure, as shown at 4. Water is then supplied to the contents of the vat and the heat generated by the lime is prevented from escaping by the manure. Thus it will be seen that the contents of the vat will rot rapidly, the straw being quickly reduced to a state where. is can be used effectively as a fertilizer in conjunction with the other solid ingredients of the vat. The water used in the disintegration of the solid materials seeps through the mass and becomes impregnated with portions of the fertilizing agents contained within the mass. This water flows from the vat through suitably arranged outlets 5 to a tank 6. If desired a cover, such as shown at 7, may be combined with the vat for the purpose of still further preventing the waste of heat generated during the process of disintegration.

In actual practice it has been found desirable to use one hundred pounds of lime and five hundred pounds of manure to one ton of straw or other waste vegetation.

The liquid fertilizer obtained by the method herein described has been found by careful analysis, to contain the following valuable ingredients: — phosphoric acid ($P_2O_5$), ammonia ($NH_3$), potash ($K_2O$).

It has been found in actual practice that the time required to properly decompose the vegetable matter contained within the vat, is from thirty to forty days. At the expiration of that time the contents of the vat can be removed and used in the same manner as ordinary manure and the liquid fertilizer collected within the tank 6 can subsequently be employed for cultivating growing plants.

The word "vegetation" as used in the specification and claims is designed to cover such growths as straw, weeds, and other like materials.

What is claimed is:—

1. The method of making a liquid fertilizer, which consists in placing straw or similar vegetation in a vat, covering the mass with a layer of quick lime, overspreading the lime with a bed of manure, and supplying water in requisite quantities to the manure to maintain the materials in a moist condition whereby to cause the lime to slake and thus generate heat to rot the vegetation and charge the water, while seeping through the mass, with active fertilizing agents.

2. The method of making a liquid fertilizer, which consists in placing straw or similar vegetation in a vat, covering the mass with a layer of quick lime, overspreading the lime with a bed of manure, and supplying water in requisite quantities to the manure to maintain the materials in a moist condition whereby to cause the lime to slake and thus generate heat to rot the vegetation and charge the water, while seeping through the mass, with phosphoric acid, ammonia and potash.

In testimony that I claim the foregoing as my own, I have hereto affixed my signature in the presence of two witnesses.

SAMUEL M. DOOLITTLE.

Witnesses:
 JOHN H. BANKS,
 SILAS C. RADER.